Figure 1:
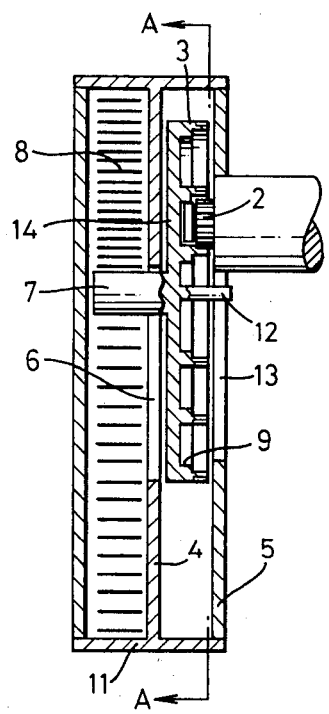

United States Patent [19]

Cunningham

[11] 4,061,291
[45] Dec. 6, 1977

[54] VARIABLE TORQUE DRIVE
[75] Inventor: Douglas James Cunningham, Steep Marsh near Petersfield, England
[73] Assignee: Wingard Limited, Chichester, England
[21] Appl. No.: 719,316
[22] Filed: Aug. 31, 1976
[51] Int. Cl.² .................. A62B 35/02; B65H 75/48
[52] U.S. Cl. ................................. 242/107; 185/37; 242/107.4 R
[58] Field of Search .................... 242/107–107.7; 280/744–747; 297/388; 267/156; 185/37, 39

[56] References Cited
U.S. PATENT DOCUMENTS 3,976,257  8/1976  Fohl .............................. 242/107 X
3,997,126  12/1976  Karlsson ........................ 242/107
4,036,449  6/1977  Schreiber ...................... 242/107

Primary Examiner—Stanley N. Gilreath
Assistant Examiner—John M. Jillions
Attorney, Agent, or Firm—J. Rodman Steele, Jr.

[57] ABSTRACT

A safety belt reel comprising a coil spring, a shaft on which a safety belt is stored and a variable torque device coupling said spring to said shaft; said variable torque device including at least one spiral body, an element which is drivably engaged with said body and means for enabling translational movement of said body when the spring is wound or unwound by withdrawal and retraction of said belt whereby the output torque of said device is varied to adjust the force exerted on said belt.

14 Claims, 6 Drawing Figures

U.S. Patent   Dec. 6, 1977   Sheet 1 of 4   4,061,291

VARIABLE TORQUE DRIVE

This invention relates to a safety belt reel comprising a coil spring, a shaft on which a safety belt is stored and a variable torque device coupling the coil spring to the shaft.

Safety belt reels usually employ a shaft which is driven by a coil spring to retract the belt when released from a fastener or buckle. The spring is coupled to the shaft so that it is wound up as the belt is withdrawn. The spring must allow the shaft to rotate by a sufficient number of turns so that the belt can be withdrawn far enough to cater for the largest occupant of a vehicle with the extremes of seat adjustment. It must also be strong enough to ensure complete retraction on the shaft when the belt is not worn. This is a problem when using a coil spring because the energy, stored in the spring, is low when the belt is almost fully retracted. However, the spring must not be so strong that it exerts such a tension on the belt to cause discomfort to the wearer. These conflicting requirements are aggravated by the increase in the diameter of the belt wound on the shaft.

The present invention seeks to overcome the above-mentioned problems by providing a variable torque device drivably coupling the coil spring to the shaft to make more effective use of the energy stored in the spring.

According to the invention, a safety belt reel comprises a coil spring, a shaft on which a safety belt is stored and a variable torque device coupling said spring to said shaft; said variable torque device including at least one spiral body, an element which is drivably engaged with said body and means for enabling translational movement of said body when the spring is wound or unwound by withdrawal and retraction of said belt whereby the output torque of said device is varied to adjust the force exerted on said belt.

Said spring and said shaft may be secured against translational movement because said body can move translationally to vary the distance between the torque output of said spring and the axis of rotation of said shaft whereby said torque is varied.

Preferably, said body has a driving surface which extends substantially perpendicularly to the axis of rotation of said shaft. This allows space to be conserved in a safety belt reel particularly in the direction in which said shaft extends.

Preferably, said element is rigid, for example, it may be a roller or gear wheel, to provide a positive drive between said shaft and said body.

Said element may be a gear wheel or dog which engages teeth on said body which is in the form of a spiral gear. A roller may be provided which engages a wall coextensive with the sprial driving surface to ensure engagement between the teeth.

In one embodiment of the invention, said element is fast with one end of the shaft, a roller is rotatably mounted adjacent said element and a spiral gear extends from a shoulder defining said wall. The spiral gear and said shoulder extend from a disc fast with a second shaft on which said spring is wound. The disc includes a third shaft coaxial with said second shaft, said second and third shafts being located in respective slots in a frame member to enable said translational movement as the belt storage shaft revolves.

An inverse arrangement is feasible wherein said element is driven by said coil spring and the belt storage shaft forms, or is coupled to a sprial gear.

According to another embodiment of the invention, the variable torque device comprises a pair of elements which respectively engage a pair of spiral gears each having a track of similar pitch but of opposite rotational direction whereby the spring torque, acting on the belt storage shaft, is varied when the spring is wound and unwound, said shaft and the centre of the spring being secured against translational movement.

Said gears may be mounted on respective sides of a disc, a said second shaft coupling the inner end of the coil spring to a dog for engaging one of the spiral gears and the first or belt storage shaft also being provided with a dog to engage the other spiral gear. As the disc rotates, it moves laterally with respect to the first and second shafts. Means are preferably provided for guiding the disc during this lateral movement and to ensure that the dogs remain engaged with the respective spiral gears. The disc can be located vertically with respect to the horizontal axes of said shafts with the track of each spiral gear extending laterally therefrom to engage the respective dogs. Alternatively, the disc is inclined with respect to the longitudinal axes of said shafts and the spiral gears are formed in the surface of the disc for engaging the respective dogs.

Helical and spiral gears can also be used, the tracks of each gear extending laterally in opposite directions thereby forming a gear block located between the respective dogs.

Figure 2:
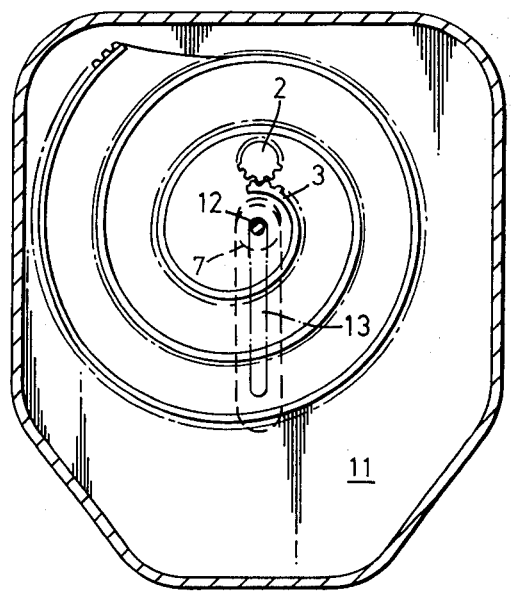
Figure 3:
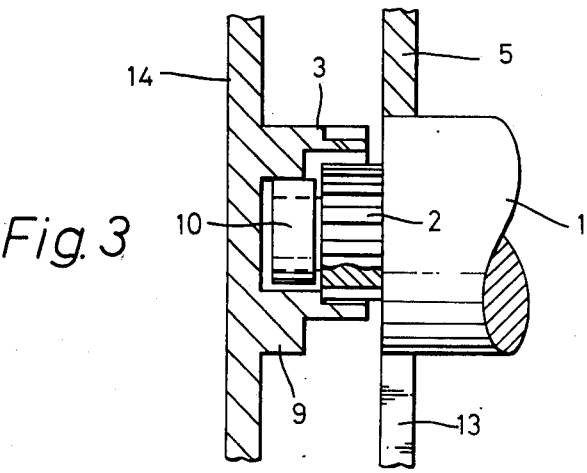
Figure 4:
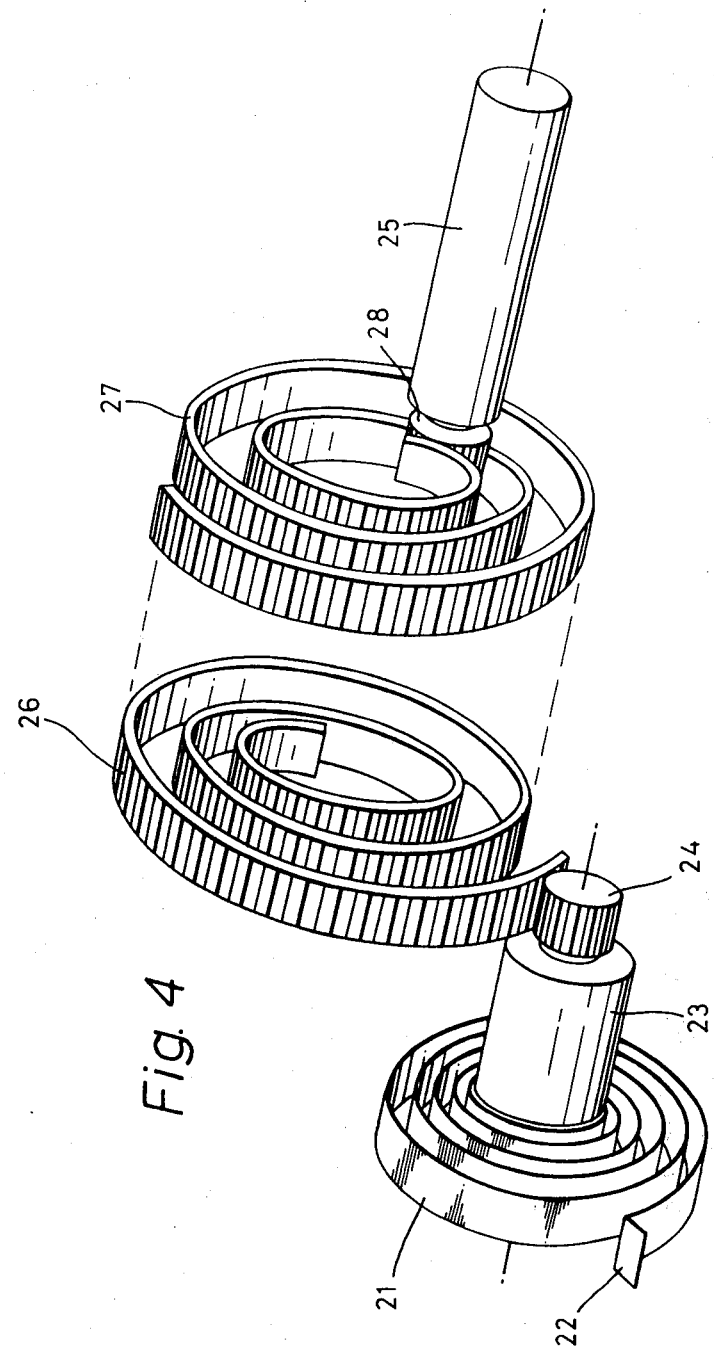
Figure 5:
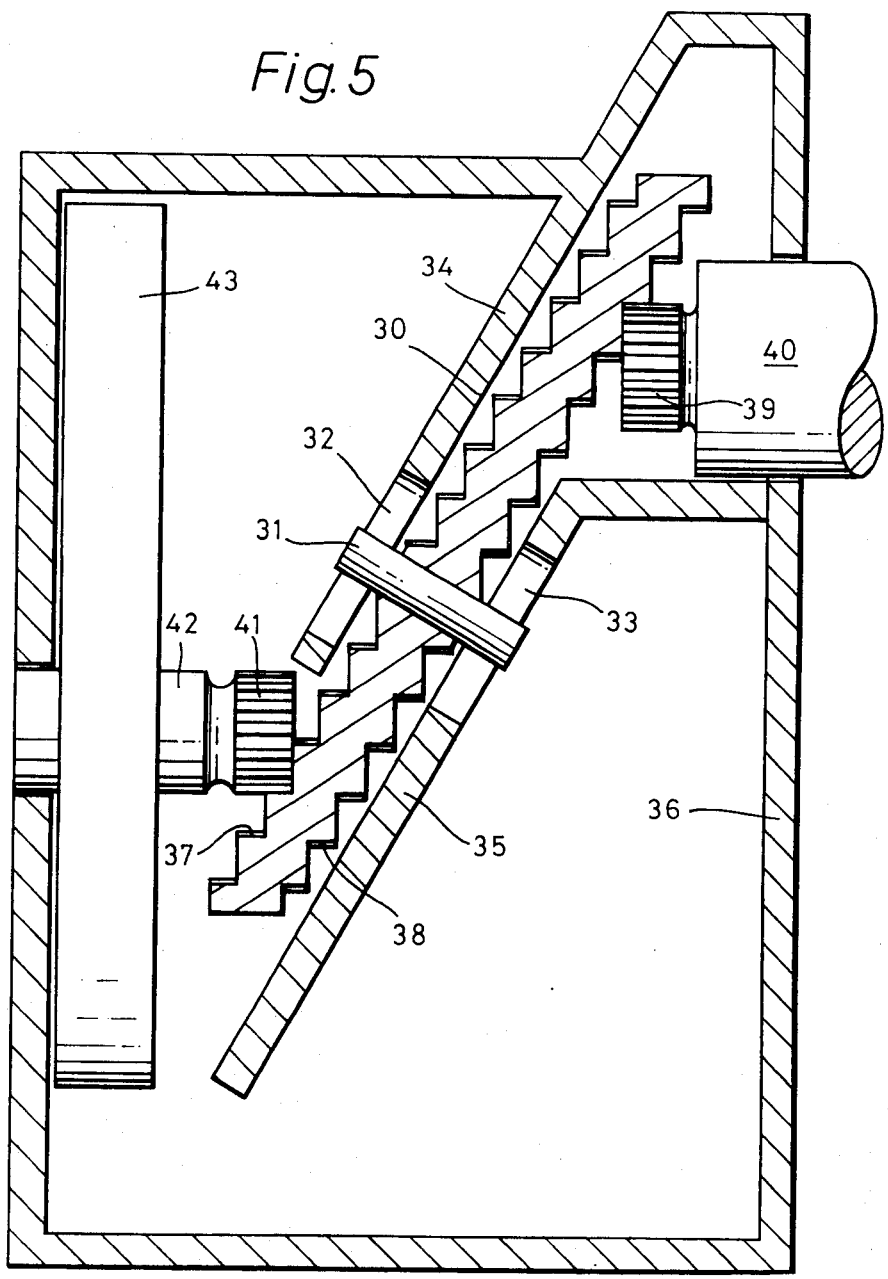
Figure 6:
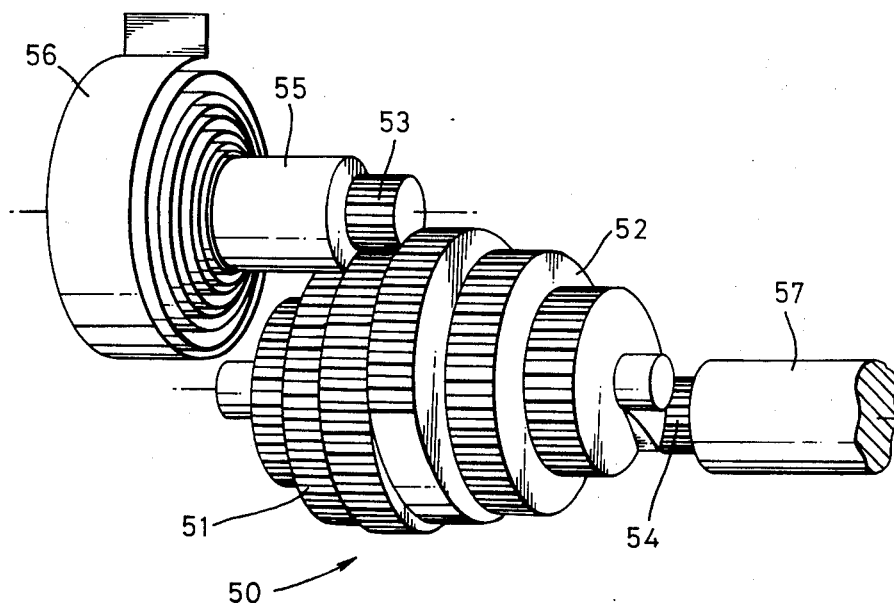

Embodiments of the invention will now be described with reference to the accompanying drawings, in which:

FIG. 1 is a sectional view through part of a safety belt reel of a first embodiment showing a variable torque device, FIG. 2 is an elevation of part of the device shown in FIG. 1 taken on line A—A, FIG. 3 is an enlarged view, in section, of another part of the device of FIG. 1, FIG. 4 illustrates most of the parts of another variable torque device according to a second embodiment, FIG. 5 illustrates, in side section, a further variable torque device according to a third embodiment, and FIG. 6 is a perspective view of a variable torque device of a fourth embodiment.

Referring to FIGS. 1-3, a safety belt storage shaft supports a safety belt (not shown) of a safety belt reel. The trunnions and inertia locking mechanism of the reel, which are well known in the art, have not been shown. The safety belt is normally wound on the shaft 1 and is retracted by a coil spring 8. The coil spring 8 has an outer end connected to a frame 11 and an inner end connected to a shaft 7. Shaft 7 is located in a linear slot 6 in a support plate 4 and a shaft 12, coaxial and fast with shaft 7, is located in a linear slot 13 in a support plate 5.

Shafts 7 and 12 are fast with a disc 14 which carries a driving surface in the form of a spiral gear 3. Gear 3 engages a driven member 2, in the form of a dog or gear, which is fast with shaft 1. The member 2 has a shaft portion which rotatably supports a roller 10, which roller engages the wall of a shoulder 9 coextensive with the sprial gear 3. This is more clearly shown in FIG. 3. Engagement between roller 10 and the wall of shoulder 9 maintains engagement between the toothed member 2 and the spiral gear 3.

FIG. 2 shows the device in a position with a safety belt (not shown) fully wound on shaft 1. As the belt is withdrawn, the spiral gear 3 rotates thereby winding spring 8 and causing shafts 7 and 12 to move along the respective slots 6 and 13. As the belt is pulled off the shaft 1, toothed member 2 is driven at a continuously increasing radial distance from the axis of shafts 7 and 12 and hence the inner driving end of the spring 8. Hence, the rate at which the spring 8 is wound decreases as the belt is withdrawn from the shaft 1.

Preferably, the change in the gear ratio is 4:1 over 20 revolutions of the shaft 1. However, other gearing arrangements are possible to achieve the required performance.

Referring to FIG. 4 a variable torque device is coupled to a coil spring 21 having a fixed outer end 22, for example, to the casing of a retractable safety belt reel, and its inner end secured to a shaft 23. The end of shaft 23 is provided with a dog 24. Shaft 23 provides the motive force for driving a shaft 25, which supports a safety belt reel (not shown), through the variable torque device comprising a pair of spiral gears 26, 27. Gears 26, 27 are located side-by-side and may extend spirally on respective major surfaces of a disc-shaped member (not shown) with which they are fast or integral. A dog 28 is provided at one end of shaft 25.

The tracks of spiral gears 26, 27 have the same pitch but are of opposite rotational direction. The disc is preferably guided, for example, in slots (not shown) on each side of the assembly shown in FIG. 4.

In order to maintain engagement between dogs 24, 28 and the respective gears 26, 27 each dog may be coupled to a roller which bears against the smooth inner side of the spiral track. Each roller may be carried by, for example, one arm of a U-shaped support, the other arm of which passes through, and rotatably supports the respective dogs 24, 28.

The belt which is stored on shaft 25 is withdrawn to cause dog 28 to rotate. Rotation of dog 8 is followed by the spiral gear 27 which moves laterally, with respect to the axis of shaft 25, due to the pitch of the track of spiral gear 27. As the spiral gear 26 is fast with spiral gear 27, it also rotates and moves laterally, its rotation driving dog 24 whereby spring 21 is wound up. As the spring 21 is wound, its torque acting though the variable torque device on shaft 25 is reduced due to the spiral gears 26, 27. When the belt is released, the spring 21 drives dog 24 thereby rotating gears 26 and 27 which drives shaft 25 to wind up the belt. As the spring 21 unwinds, the torque acting on shaft 25 increases, due to the spiral gears 26, 27, thereby ensuring positive retraction.

FIG. 5 illustrates a third embodiment wherein the variable torque device comprises a disc 30 mounted for rotation on a shaft 31 supported in slots 32, 33, in inwardly directed wall portions 34, 35 of a casing 36. Wall portions 34, 35 support disc 30 during rotation. The disc 30 has spiral tracks 37, 38 on each of its major surfaces, the spiral tracks having the same pitch but being of opposite rotational direction. Track 38 is engaged by a dog 39 fast with a belt storage shaft 40. A dog 41 engages track 37 and is fast with a shaft 42 secured to the inner end of a coil spring 43.

Operation of the device shown in FIG. 5 is similar to that of the device described above with reference to FIG. 4, so no further description will be given.

FIG. 6 illustrates a third embodiment in which the variable torque device comprises a block 50 with helical gears 51, 52. The helical gears 51, 52 are engaged by respective dogs 53, 54. Dog 53 is fast with a shaft 55 having its other end secured to the inner end of a coil spring 56. Dog 54 is fast with a reel storage shaft 57.

In this embodiment, the block 50 moves axially in the direction of the longitudinal axes of shafts 55 and 57, as well as transversely of said axes, as the coil spring 56 is wound and unwound. Such movement may be enabled by inclined guides or slots (not shown) receiving bearings (not shown) which support block 50.

The arrangements of FIGS. 5 and 6 impose less limitation on the size of the dogs engaging the spiral or helical gears because the dogs 24, 28 shown in FIG. 4 must be accommodated between adjacent turns of the respective tracks of the gears 26, 27.

What we claim is:

1. A safety belt reel comprising a coil spring, a shaft on which a safety belt is stored and a variable torque device coupling said spring to said shaft; said variable torque device including at least one spiral body, driven means coupled to said shaft and driveably engaged with said body; slotted support means, said spiral body being mounted for translational movement in said slotted support means, which translational movement takes place when said spring is wound or unwound by withdrawal and retraction of said belt, said translational movement causing a change in the radius of action of a couple acting between said spring and said shaft whereby the output torque of said device is varied to adjust the force exerted on said belt.

2. A safety belt reel according to claim 1 wherein said coil spring and said shaft are respectively secured against said translational movement.

3. A safety belt reel according to claim 2 wherein said body is substantially disc-shaped and has a spiral driving surface which extends substantially perpendicularly to the axis of rotation of said shaft.

4. A safety belt reel according to claim 3 wherein said driven means comprises a gear wheel and said body comprises a spiral gear engaged with said gear wheel.

5. A safety belt reel according to claim 4 wherein the spiral gear extends from the disc-shaped body, said body including a wall co-extensive with the spiral driving surface, and wherein said driven means comprises said gear wheel and a roller, said gear wheel being mounted for rotation with said roller, said gear wheel engaging said spiral gear, and said roller engaging said wall to ensure engagement between the gear wheel and the spiral gear.

6. A safety belt reel according to claim 5 wherein said disc-shaped body is provided with second and third shafts concentric therewith, the coil spring being wound on the second shaft and the third shaft for guiding said disc-shaped body for translational movement in said slotted support means.

7. A safety belt reel according to claim 6 including a frame member and wherein said slotted support means includes a pair of opposed slots in said frame member for receiving said second and third shafts.

8. A safety belt reel according to claim 1 wherein said spiral body includes a pair of spiral gears, and the variable torque device comprises a pair of driven elements, said driven elements engaging said spiral gears on said body, each of said spiral gears having a track of similar pitch but of opposite rotational direction whereby the spring torque, acting on the belt storage shaft, is varied when the spring is wound and unwound, said shaft and the center of the spring being secured against said translational movement.

9. A safety belt reel according to claim 8 further comprising a disc, said spiral gears being mounted on respective and opposite side of said disc.

10. A safety belt reel according to claim 9 further comprising a second shaft, the inner end of said spring being fast with said second shaft, a gear wheel supported by said second shaft, said gear wheel engaging one of said spiral gears, and a further gear wheel fast with one end of the belt storage shaft engaging the other one of said spiral gears.

11. A safety belt reel according to claim 10 including means for guiding the disc during translational movement to ensure that said gear wheels remain engaged with the respective spiral gears.

12. A safety belt reel according to claim 10 wherein the disc is substantially perpendicular to the axis of rotation of the belt storage shaft.

13. A safety belt reel according to claim 10 wherein the disc is inclined with respect to the rotational axes of said first and second shafts, and third and fourth shafts, said disc being supported by said third and fourth shafts which are concentric with said disc, said third and fourth shafts being slideably located in said slotted support means.

14. A safety belt reel according to claim 8 wherein said spiral gears are helical and extend in opposite directions to define a gear block, a pair of gear wheels connected to the inner end of said spring and to one end of the belt storage shaft for respectively engaging said helical gears.

* * * * *